United States Patent [19]

Hayman et al.

[11] 3,886,638

[45] June 3, 1975

[54] MULTI-WAY VALVE PORTING BLOCK

[75] Inventors: Dennis J. Hayman, Abilene; Robert George Stultz, McKinney, both of Tex.

[73] Assignee: Hydrometals, Inc., Dallas, Tex.

[22] Filed: June 15, 1973

[21] Appl. No.: 370,228

[52] U.S. Cl.... 29/157.1 R; 29/DIG. 26; 137/561 A; 137/625.4; 251/366
[51] Int. Cl.................. B23p 15/00; B23p 13/00
[58] Field of Search........ 29/157.1 R, 557, DIG. 26; 137/561 R, 561 A, 625.4; 251/366

[56] References Cited
UNITED STATES PATENTS

| | | | |
|---|---|---|---|
| 1,956,554 | 5/1934 | Baldwin | 29/157.1 R |
| 2,309,666 | 2/1943 | Parker | 29/157.1 R |
| 2,364,864 | 12/1944 | Martin | 29/157.1 R |
| 2,414,966 | 1/1947 | Melichar | 29/157.1 R |
| 3,417,450 | 12/1968 | Zell | 29/157.1 R |
| 3,441,996 | 5/1969 | Boothe | 29/157.1 R |
| 3,530,881 | 9/1970 | Tanner et al. | 137/561 R |

*Primary Examiner*—C. W. Lanham
*Assistant Examiner*—Dan C. Crane
*Attorney, Agent, or Firm*—Wofford, Felsman, Fails & Zobal

[57] ABSTRACT

An improvement in a method of forming a multi-way valve porting block for a mixing valve having a control head and respective conduits for hot water, cold water and controlled water characterized by the steps of: cutting off a predetermined thickness of a metallic bar stock having the desired cross sectional shape with a plurality of arms extending radially outwardly at 90° angles from a central point to form a solid block of the desired shape; and, thereafter, forming by machining respective large bores and smaller apertures in the respective conduits. The bar stock may have a Tee-shaped cross section or a cross-shaped cross section for respective three-way and four-way valve porting blocks, such as for tub alone or both tub and shower. Also disclosed are specific approaches to forming an aspirating passageway and aperture in the arm that will be connected with the tub or the like to prevent water from undesirably flowing upwardly and out of a shower, as well as the respective types of machining operations and preferred structural forms.

3 Claims, 12 Drawing Figures

PATENTED JUN 3 1975 3,886,638

SHEET 1

MULTI-WAY VALVE PORTING BLOCK

BACKGROUND OF THE INVENTION

1. Field of the Invention:

This invention relates to multi-way valve porting blocks for use with mixing faucet valves. More particularly, it relates to an improved method of forming multi-way valve porting blocks.

2. Description of the Prior Art:

The prior art has seen the use of mixing faucet valves. Several embodiments of such mixing valves employed multi-way valve porting blocks to receive the large conduits carrying, respectively, the hot water, the cold water and the controlled wate to a tub or shower or the like. These valve porting blocks had respective smaller apertures penetrating through a side wall thereof and connected with a control head for carrying the respective hot, cold and controlled waters to and from the control head. Heretofore the multi-way valve porting blocks have been cast with the final machining operations being carried out on the cast block.

It is an object of this invention to provide an improved method of forming the multi-way valve porting blocks that is more economical than those of the prior art.

It is a particular object of this invention to provide three-way and four-way valve porting blocks by methods that are more economical than those of the prior art approaches.

These and other objects will become apparent from the following descriptive matter, particularly when taken in conjunction with the drawings.

DESCRIPTION OF PREFERRED EMBODIMENTS

Figure 1:
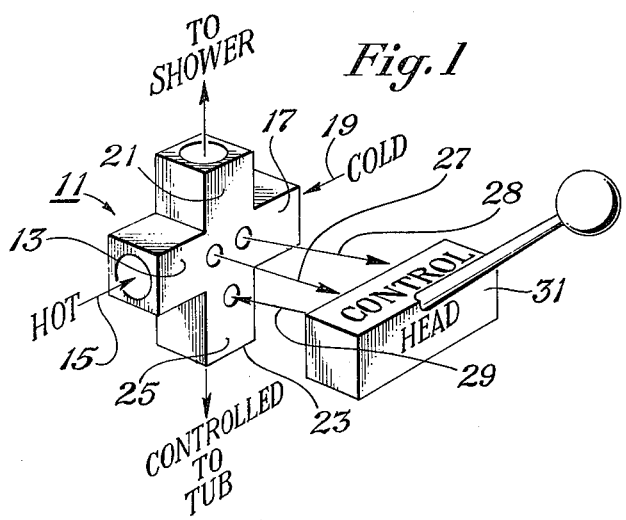
FIG. 1 is a schematic diagram of one embodiment of this invention.

Referring to FIG. 1, a four-way valve porting block 11, made in accordance with one embodiment of this invention, has one laterally extending arm 13 connected with a hot water conduit 15; and has a second laterally extending arm 17 connected with a cold water conduit 19. The four-way valve porting block 11 has its pair of perpendicular arms 21 and 23 connected respectively with controlled water conduits for carrying the water at a controlled temperature and volume to, respectively, a tub and a shower. Conventionally, only one valve diverting means is employed intermediate the four-way valve block 11 and a tub so as to divert the controlled water through the shower head. This arrangement requires aspirating the water downwardly to the tub to prevent it flowing undesirably out of the shower head. The problem of forming suitable aspirating passageways will be discussed in more detail hereinafter with respect to FIGS. 5 and 7–10.

The four-way valve porting block 11 has a plurality of three smaller apertures cut into its side wall 25 and connected with respective conduits 27–29 for, respectively, the hot water, the cold water and the controlled water to and from the control head 31. Many different types of control heads are well known. As illustrated, the control head 31 is of the single handle control type, although any other suitable type may be employed. A single handle faucet valve type control head is described in U.S. Pat. No. 3,680,592, entitled "Single Handle Faucet Valve," issued to Dennis J. Hayman and assigned to Hydrometals Inc., Dallas, Texas. The principles of U.S. Pat. No. 3,680,592 are applicable herein even though the controlled stream may be returned to the valve porting block instead of being sent directly to a faucet outlet. No extended discussion of the control heads is believed necessary herein, since they are not being claimed, per se. It is sufficient to note that the proportion and volume of the respective hot and cold water streams are admixed to form a controlled water stream of the desired temperature. The controlled water stream is then supplied, as indicated hereinbefore, to a tub, a shower or the like.

Figure 2:
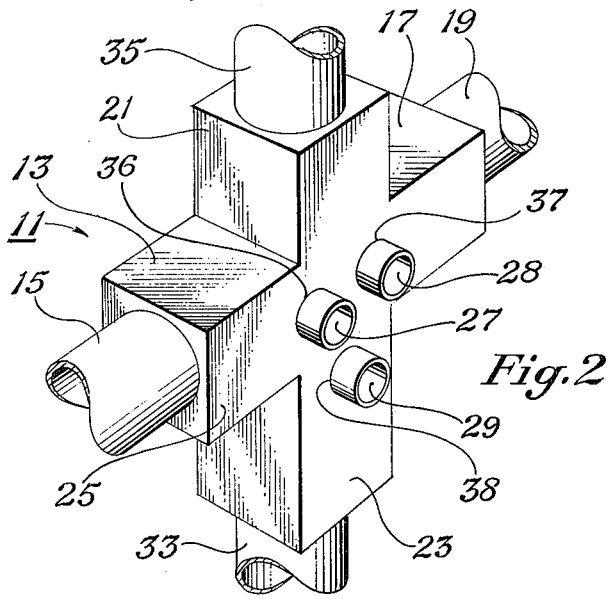
FIG. 2 is an isometric view of the four-way valve porting block of the embodiment of FIG. 1.
Figure 3:
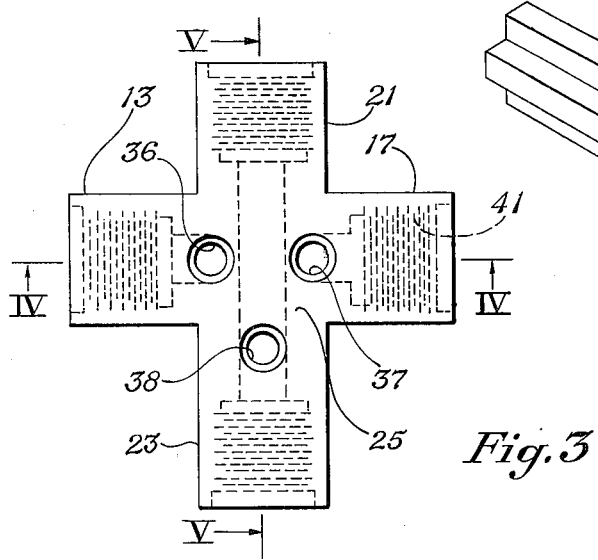
FIG. 3 is a front elevational view of the four-way valve porting block of FIG. 2.
Figure 4:
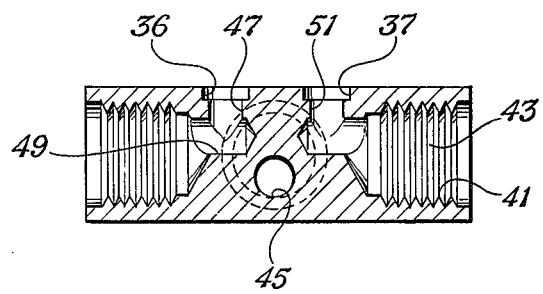
FIG. 4 is a cross sectional view taken along the lines IV—IV of FIG. 3.

As illustrated in FIG. 2, the first and second laterally extending arms 13 and 17 are connected with their respective hot and cold water conduits 15 and 19. The respective perpendicular arms 21 and 23 are connected with the respective conduits 33 and 35 for delivering controlled water to a tub and shower. The respective smaller apertures 36–38 are connected with their respective conduits 27–29 for carrying the hot and cold water to the control head 31, FIG. 1, and carrying the return, or controlled water from the control head 31 back to the porting block 11 for being delivered to conduits 33 or 35. In accordance with conventional practice, the respective conduits are sealingly connected with their respective bores and apertures. The sealing connection with the respective conduits may be made by way of any of the conventional means; such as, soldering, brazing, threaded connection or the like. The configuration of the respective bores, smaller apertures and interconnecting passageways, as well as the steps in the method of forming the four-way valve porting block will become clear from the following descriptive matter with respect to FIGS. 3–6. A predetermined thickness T is cut from metallic bar stock 39. The metallic bar stock 39 is formed of the desired metallic alloys for use in the four-way valve porting block 11. Ordinarily, it is preferable to employ a noncorrodible metallic alloy, such as the copper alloys like brass or the like. If desired, other corrosion resistant alloys, such as stainless steel, mey be employed. They are difficultly machineable and are ordinarily employed only for special corrosive fluids, not for ordinary household plumbing. The metallic bar stock 39 has a cross sectional shape in the form of a cross with the two laterally extending arms 13 and 17 and the two perpendicular arms 21 and 23 that extend perpendicularly to the laterally extending arms 13 and 17. Thus, a solid cross-shaped block is formed. Preferably, the downwardly extending perpendicular arm 23 is somewhat longer than the upwardly extending perpendicular arm 21. A large bore 41 is formed in each of the four arms 13, 17, 21 and 23. The large bore 41 is formed by machining and is adapted for being connected with the respective conduits carrying the respective waters. Specifically, the machining may be only drilling if the respective conduits are to be emplaced by swaging, soldering, brazing or any suitable combination thereof. As illustrated, however, the bores 41 each have an internal thread 43 for threadedly and sealingly receiving the respective conduits therewithin.

Figure 5:
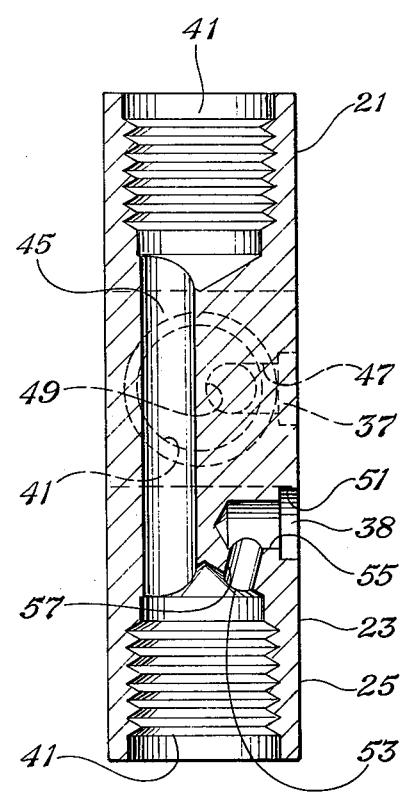
FIG. 5 is a cross sectional view taken along the lines V—V of FIG. 3.
Figure 6:
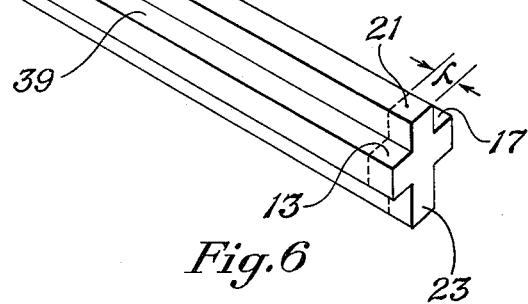
FIG. 6 is an isometric view of a cross-shaped metallic bar stock that is satisfactory for forming the basic block for the four-way valve porting block of FIG. 2.
Figure 7:
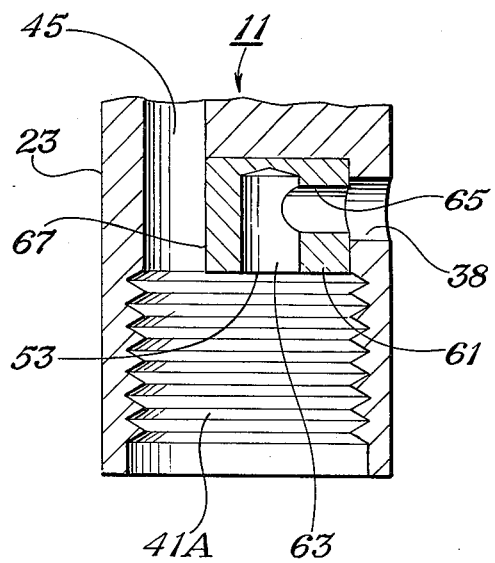
FIG. 7 is a partial cross sectional view of another embodiment of this invention showing an insert for forming the aspirating passageway for a four-way valve porting block.

A smaller bore 45, FIG. 5, is formed by machining, as by drilling, through the respective bores 41 of the respective perpendicular arms 21 and 23. The smaller bore 45 thus extends longitudinally of the four-way valve porting block and longitudinally of the respective perpendicular arms 21 and 23 and communicates with the respective first large bores 41 formed therewithin. Thus, it can be seen that if the flow of water downwardly out of the arm 23 is blocked, any controlled water will flow upwardly through the smaller bore 45 and out of the arm 21 and a shower head to which it is connected.

The smaller apertures 36–38 are formed by machining through the side wall 25. As illustrated, the smaller apertures 36 and 37, FIGS. 3 and 4, mark the termination of intersecting passageways 47 and 49 for conveying the respective hot and cold water streams to the control head 31, FIG. 1. As illustrated, each of the passageways 47 is counter bored to form a small annular recess 51 for receiving the respective conduits 27–29 that will be brazed in place. The respective passageways 47 and 49 are shown in dashed lines in FIG. 5, also. As indicated hereinbefore, any other means, such as threaded connection, could be employed for connecting the respective conduits 27–29 with the respective apertures 36–38.

The aperture 38 is connected with an aspirating passageway that terminates in an aspirating aperture 53 communicating with the bore 41 in arm 23, FIG. 5. As illustrated, the aspirating passageway comprises first passageway 55 and a second intersecting passageway 57. The first passageway 55 is machined, or drilled, from the side wall 25 inwardly. The second passageway 57 is drilled through the bore 41 at an angle so as to intersect the first passageway 55 and terminate at the aspirating aperture 53. The aspirating aperture 53 is located sufficiently near the center of the bore 41 that it will aspirate the water downwardly and prevent its climbing through the smaller bore 45 and the conduit 35, FIG. 2, upwardly to the shower head. This prevents undesired flow outwardly through the shower head during the filling of the tub or the like. Accomplishing the aspirating passageway turned out to be a difficult operation and earlier attempts were not successful. Earlier attempts to drill the aspirating passageway 57 straight, rather than at an angle failed and caused adverting to other embodiments, as described later hereinafter with respect to FIGS. 7–10. As illustrated, the first passageway 55 has an annular recess 51 such that the aperture 38 is adapted for being connected to the smaller conduit 29, similarly as described hereinbefore with respect to conduits 27 and 28 and apertures 36 and 37.

From the foregoing descriptive matter, the respective steps have been delineated in the method of forming the four-way valve porting block 11. Moreover, the operation of the valve porting block in conducting the respective hot, cold and controlled waters to and from the control head and to their ultimate using destination has been implied and described with respect to FIG. 1. Accordingly, it is not believed necessary to go into the well known details of operation any further herein.

As indicated hereinbefore, we had difficulty forming the aspirating passageway by merely drilling straight into the body. Consequently, in one embodiment that we adverted to, an insert 61, FIGS. 7 and 8, was brazed into a larger first large bore 41A to provide the aspirating action by the entering water. The arm 23 has the first large bore 41A drilled more deeply thereinto, and the aperture 38 is drilled directly into the bore. The insert 61 has a third small bore 63 that is machined, or drilled, thereinto so as to intersect a fourth small bore 65. The fourth small bore 65 communicates with the aperture 38, while the third small bore 63 terminates in the aspirating aperture 53. The insert 61 has its bottom portion abbreviated, as by being milled off, to form the straight edge 67. In this way, the bore 45 is open to afford fluid communication between the tub and shower conduits 33 and 35 without having to worry about alignment of a machined, or drilled, aperture.

In operation, the remainder of the four-way valve porting block 11 was formed as described hereinbefore, except that the first large bore 41A is drilled more deeply into the body. Thereafter, the insert 61 having the respective third and fourth small bores 63 and 65 formed thereinto, is emplaced in the first large bore 41A with the fourth small bore 65 aligned with the small aperture 38. The insert 61 thereafter brazed into place to form the final porting block 11 that operates as described hereinbefore.

Figure 9:
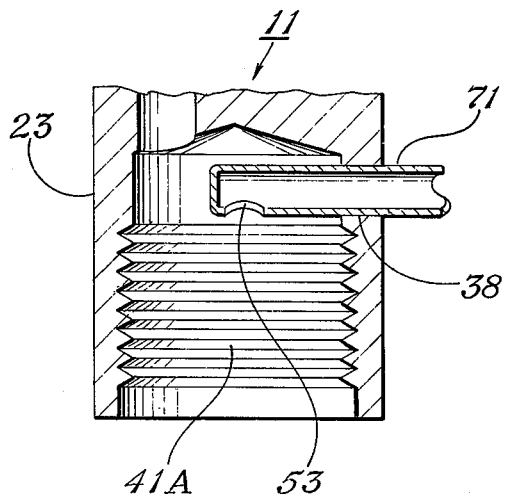
FIG. 9 is a partial cross sectional view of another embodiment of this invention showing a closed end tubing forming the aspirating passageway.
Figure 10:
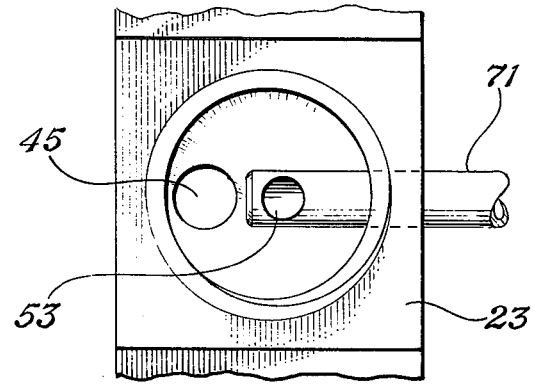
FIG. 10 is a partial end view of the embodiment of FIG. 9.

Still another embodiment was employed for forming the aspirating passageway. That embodiment is shown in FIGS. 9 and 10. Therein, the arm 23 of the valve porting block 11 has the small aperture 38 formed therewith. A closed end tubing 71 is inserted through and brazed into place in the aperture 38. The closed end tubing 71 has the aspirating aperture 53 formed into its side wall. The closed end tubing 71 is fed into the enlarged first bore 41A until the aspirating aperture 53 is properly positioned to effect the desired aspiration. Thereafter, the closed end tubing 71 is brazed into the smaller aperture 38. The resulting four-way valve porting block 11 operates as described hereinbefore.

Figure 11:
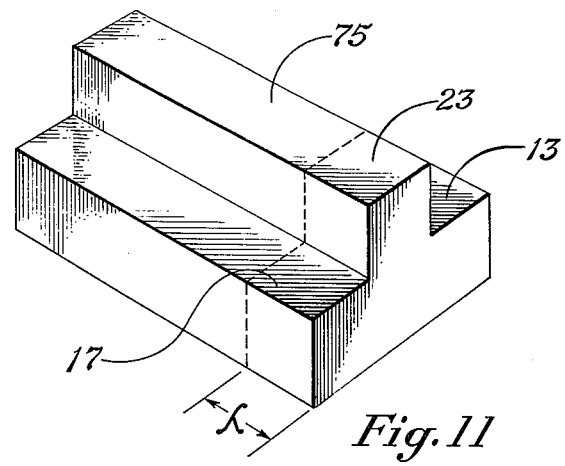
FIG. 11 is an isometric view of Tee-shaped bar stock for use in forming a three-way valve porting block.
Figure 8:
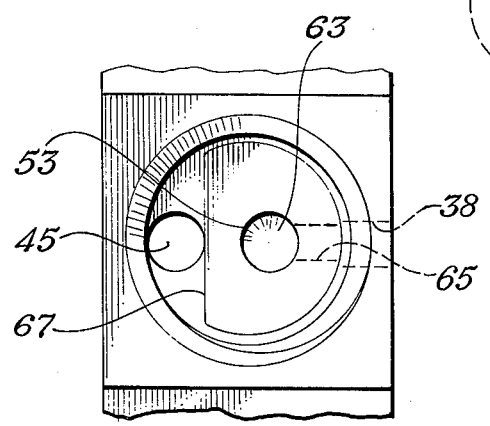
FIG. 8 is a partial end view of the embodiment of FIG. 7.
Figure 12:
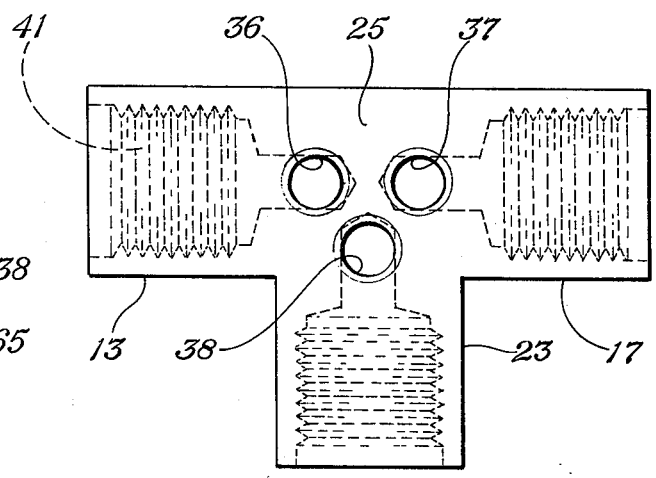
FIG. 12 is a front elevational view of a three-way valve porting block of another embodiment of this invention.

A four-way valve porting block 11 has been described hereinbefore. If only a tube is being employed, it may not be necessary to employ a four-way valve porting block, since a three-way valve porting block will be satisfactory. This embodiment is illustrated in FIGS. 11 and 12. Therein, a Tee-shaped metallic bar stock 75 has a first thickness T cut therefrom for forming a solid block of Tee-shaped cross section with three respective arms. There are the same two laterally extending arms 13 and 17 as described hereinbefore. This time, however, there is only one arm 23 extending perpendicular to the laterally extending arms. As illustrated in FIG. 12, the respective large bores 41 are formed into the respective arms 13, 17 and 23 by machining operation, such as drilling. The large bores 41 may be any of the conventional types appropriate to the types of ends of conduits with which they will be connected, similarly as described hereinbefore. Thereafter, a plurality of smaller apertures 36-38 are formed, similarly as described hereinbefore. The smaller apertures 36-38 communicate respectively with the respective larger bores 41 in the respective arms 13, 17 and 23. The communication may be formed by drilling the bores 41 more deeply and drilling a single aperture directly through the side wall 25 or may comprise intersecting passageways, such as first and second passageways 47 and 49 of FIG. 4. The embodiment of FIG. 12 does not require the aspirating passageway as was required with the four-way valve porting block 11, since it is not connected with a shower head through which water could spray undesirably. The respective smaller apertures 36-38 are adapted for being connected with respective smaller conduits 27-29 to and from the control head 31, similarly as described hereinbefore. The operation of the three-way valve porting block is the same as described hereinbefore, except for the omission of the shower connection and the necessity for the aspirating of the water through the arm 23.

While this invention has been described hereinbefore for use with a mixing valve for admixing hot and cold water to form a controlled water stream, it may be employed for admixing a controlled proportion and volume of any other fluids from one or more sources to form a controlled fluid for delivery to a sink.

While an internally threaded bore 41 has been described hereinbefore, an externally threaded protrusion may be formed in the respective arms and about the respective bores if desired. This is a more expensive machining operation, however, and requires additional conduit fittings or the like for satisfactory operation. Consequently, it will be adverted to only in special instances, such as in replacement operations and the like.

Respective metallic bar stock of the desired cross sectional shape has been described hereinbefore without any preferred method of forming it. Preferably, the metallic bar stock is formed by extruding the metal through a die having the desired cross sectional shape, since this is the most economical method for forming the bar stock that is currently known. Any other method of obtaining the bar stock may be employed, however.

From the foregoing description, it can be seen that this invention accomplishes the objects delineated hereinbefore. In specific embodiments, by utilizing the methods of our invention, we have been able to drastically reduce the cost of producing the multi-way valve porting blocks as contrasted to the cast units.

Although this invention has been described with a certain degree of particularity, it is understood that this disclosure has been made only by way of example and that numerous changes in the details of construction and the combination and arrangement of parts may be resorted to without departing from the spirit and the scope of this invention.

What is claimed is:

1. A method of forming a four-way valve porting block for a mixing valve having a control head and respective conduits for, respectively, hot and cold water from a source and controlled water to one of a tub and shower comprising the steps of:

a. cutting off a predetermined thickness of a four-way metallic bar stock having a cross sectional shape in the form of a cross with two laterally extending arms and two aligned perpendicular arms extending normal to said laterally extending arms to form a solid cross shaped block with four respective arms;

b. forming by machining a first large bore in each of said four arms for conformingly and sealingly receiving respective large conduits carrying the respective waters;

c. forming by machining a first smaller bore extending longitudinally of said two perpendicular arms and communicating with the respective first large bores formed therewithin; one arm being adapted for connection with conduit leading to a shower and the other arm being adapted for connection with conduit leading to a tub;

d. forming by machining two smaller apertures extending laterally through one side wall of said cross shaped block and communicating, respectively, with each of said first large bores in said laterally extending arms; said smaller apertures being adapted for being connected with smaller conduits to the control head; and e. forming an aspirating passageway extending through said side wall and in communication with said first large bore in said other arm, of said two perpendicular arms, for being installed pointing downwardly and connected with said conduit leading to said tub; said aspirating passageway being adapted for being connected with a smaller conduit from the control head and terminating in an aspirating aperture near the center of said first large bore of said other arm, said aspirating passageway being formed by drilling two intersecting third and fourth bores.

2. A method of forming a four-way valve porting block for a mixing valve having a control head and respective conduits for, respectively, hot and cold water from a source and controlled water to one of a tub and shower comprising the steps of:

a. cutting off a predetermined thickness of a four-way metallic bar stock having a cross sectional shape in the form of a cross with two laterally extending arms and two aligned perpendicular arms extending normal to said laterally extending arms to form a solid cross shaped block with four respective arms;

b. forming by machining a first large bore in each of said four arms for conformingly and sealingly receiving respective large conduits carrying the respective waters;

c. forming by machining a first smaller bore extending longitudinally of said two perpendicular arms and communicating with the respective first large bores formed therewith; one arm being adapted for connection with conduit leading to a shower and the other arm being adapted for connection with conduit leading to a tub;

d. forming by machining two smaller apertures extending laterally through one side wall of said cross shaped block and communicating, respectively, with each of said first large bores in said laterally extending arms; said smaller apertures being adapted for being connected with smaller conduits to the control head; and e. forming an aspirating passageway extending through said side wall and in communication with said first large bore in said other arm, of said two perpendicular arms, for being installed pointing downwardly and connected with said conduit leading to said tub; said aspirating passageway being adapted for being connected with a smaller conduit from the control head and terminating in an aspirating aperture near the center of said first large bore of said other arm, said aspirating passageway being formed by providing a smaller conduit from said control head that comprises a closed end tubing having an aspirating aperture in its side wall; and a portion of said aspirating passageway is formed by machining a smaller aperture through said side wall and inserting and brazing said closed end tubing in place extending through said smaller aperture with said aspirating aperture located near the center of said first large bore in said other arm and communicating with the passageway within said tubing.

3. A method of forming a four-way valve porting block for a mixing valve having a control head and respective conduits for, respectively, hot and cold water from a source and controlled water to one of a tub and shower comprising the steps of:

a. cutting off a predetermined thickness of a four-way metallic bar stock having a cross sectional shape in the form of a cross with two laterally extending arms and two aligned perpendicular arms extending normal to said laterally extending arms to form a solid cross shaped block with four respective arms;

b. forming by machining a first large bore in each of said four arms for conformingly and sealingly receiving respective large conduits carrying the respective waters;

c. forming by machining a first smaller bore extending longitudinally of said two perpendicular arms and communicating with the respective first large bores formed therewithin; one arm being adapted for connection with conduit leading to a shower and the other arm being adapted for connection with conduit leading to a tub;

d. forming by machining two smaller apertures extending laterally through one side wall of said cross shaped blodk and communicating, respectively, with each of said first large bores in said laterally extending arms; said smaller apertures being adapted for being connected with smaller conduits to the control head; and e. forming an aspirating passageway extending through said side wall and in comminication with said first large bore in said other arm, of said two perpendicular arms, for being installed pointing downwardly and connected with said conduit leading to said tub; said aspirating passageway being adapted for being connected with a smaller conduit from the control head and terminating in an aspirating aperture near the center of said first large bore of said other arm, said aspirating passageway being formed by machining a smaller aperture through said side wall, said smaller aperture being adapted for being connected with said smaller conduit from said control head; and forming an insert and brazing said insert in place in said first large bore; said insert having a third bore communicating with said smaller aperture and a fourth bore communicating with said third bore and terminating in said aspirating aperture.

* * * * *

UNITED STATES PATENT OFFICE
CERTIFICATE OF CORRECTION

Patent No. 3,886,638        Dated June 3, 1975

Inventor(s) Dennis J. Hayman and Robert George Stults

It is certified that error appears in the above-identified patent and that said Letters Patent are hereby corrected as shown below:

The spelling of the surname of the second named inventor is corrected to read ---Stults---.

Signed and Sealed this fourteenth Day of October 1975

[SEAL]

Attest:

RUTH C. MASON
*Attesting Officer*

C. MARSHALL DANN
*Commissioner of Patents and Trademarks*